US008464261B2

(12) United States Patent
Moir et al.

(10) Patent No.: US 8,464,261 B2
(45) Date of Patent: Jun. 11, 2013

(54) SYSTEM AND METHOD FOR EXECUTING A TRANSACTION USING PARALLEL CO-TRANSACTIONS

(75) Inventors: Mark S. Moir, Windham, NH (US); Robert E. Cypher, Saratoga, CA (US); Daniel S. Nussbaum, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 438 days.

(21) Appl. No.: 12/750,901

(22) Filed: Mar. 31, 2010

(65) Prior Publication Data

US 2011/0246993 A1 Oct. 6, 2011

(51) Int. Cl.
*G06F 9/46* (2006.01)
*G06F 13/28* (2006.01)

(52) U.S. Cl.
USPC ............................ 718/101; 718/106; 711/147

(58) Field of Classification Search
None
See application file for complete search history.

(56) References Cited

U.S. PATENT DOCUMENTS

| | | | |
|---|---|---|---|
| 5,428,761 A | 6/1995 | Herlihy et al. | |
| 5,504,899 A * | 4/1996 | Raz ........................................ | 1/1 |
| 6,385,715 B1 | 5/2002 | Merchant et al. | |
| 6,735,760 B1 | 5/2004 | Dice | |
| 6,785,803 B1 | 8/2004 | Merchant et al. | |
| 6,792,446 B2 | 9/2004 | Merchant et al. | |
| 6,862,664 B2 | 3/2005 | Tremblay et al. | |
| 6,886,081 B2 | 4/2005 | Harres | |
| 6,912,648 B2 | 6/2005 | Hammarlund et al. | |
| 6,952,764 B2 | 10/2005 | Sager et al. | |
| 7,219,349 B2 | 5/2007 | Merchant et al. | |
| 7,346,747 B1 | 3/2008 | Nussbaum et al. | |
| 7,395,382 B1 | 7/2008 | Moir | |
| 7,487,160 B2 * | 2/2009 | Whyte ................................. | 1/1 |
| 7,496,726 B1 | 2/2009 | Nussbaum et al. | |
| 7,774,565 B2 * | 8/2010 | Lewin et al. ................... | 711/162 |
| 8,117,403 B2 | 2/2012 | Heller et al. | |
| 8,171,491 B2 | 5/2012 | Monnie et al. | |
| 8,185,875 B2 | 5/2012 | Kohlon et al. | |
| 2001/0014905 A1 | 8/2001 | Onodera | |

(Continued)

OTHER PUBLICATIONS

Yosef Lev and Mark Moir and Dan Nussbaum (Aug. 2007). PhTM: Phased Transactional Memory. TRANSACT~'07: 2nd Workshop on Transactional Computing, 11 pages.

(Continued)

*Primary Examiner* — Camquy Truong
(74) *Attorney, Agent, or Firm* — Robert C. Kowert; Meyertons, Hood, Kivlin, Kowert & Goetzel, P.C.

(57) ABSTRACT

The transactional memory system described herein may implement parallel co-transactions that access a shared memory such that at most one of the co-transactions in a set will succeed and all others will fail (e.g., be aborted). Co-transactions may improve the performance of programs that use transactional memory by attempting to perform the same high-level operation using multiple algorithmic approaches, transactional memory implementations and/or speculation options in parallel, and allowing only the first to complete to commit its results. If none of the co-transactions succeeds, one or more may be retried, possibly using a different approach and/or transactional memory implementation. The at-most-one property may be managed through the use of a shared "done" flag. Conflicts between co-transactions in a set and accesses made by transactions or activities outside the set may be managed using lazy write ownership acquisition and/ or a priority-based approach. Each co-transaction may execute on a different processor resource.

20 Claims, 10 Drawing Sheets

U.S. PATENT DOCUMENTS

| | | | |
|---|---|---|---|
| 2003/0126187 A1 | 7/2003 | Won et al. | |
| 2005/0278393 A1* | 12/2005 | Huras et al. | 707/202 |
| 2006/0085591 A1 | 4/2006 | Kumar et al. | |
| 2007/0143287 A1 | 6/2007 | Adl-tabatabai et al. | |
| 2007/0186056 A1 | 8/2007 | Saha et al. | |
| 2008/0313645 A1 | 12/2008 | Birrell et al. | |
| 2009/0070774 A1 | 3/2009 | Raikin et al. | |
| 2009/0172299 A1 | 7/2009 | Goodman | |
| 2009/0172306 A1 | 7/2009 | Nussbaum et al. | |
| 2009/0282386 A1 | 11/2009 | Moir et al. | |
| 2009/0282405 A1 | 11/2009 | Moir et al. | |
| 2010/0138841 A1* | 6/2010 | Dice et al. | 718/107 |

OTHER PUBLICATIONS

Yossi Lev, Victor Luchangco, Virendra Marathe, Mark Moir, Dan Nussbaum, Marek Olszewski. Anatomy of a scalable software transactional memory. TRANSACT 2009: The 4th ACM SIGPLAN Workshop on Transactional Computing, 10 pages.

Hardware Atomicity for Reliable Software Speculation, Naveen Neelakantam, Ravi Rajwar, Suresh Srinivas, Uma Srinivasan, and Craig Zilles. ISCA 2007, 12 pages.

David Dice, et al., "Applications of the Adaptive Transactional Memory Test Platform," 2008, pp. 1-10.

Michael A. Bender, et al., Adversarial Contention Resolution for Simple Channels, SPAA 2005, ACM, pp. 1-8.

M. L. Scott and W. N. Scherer III, "Scalable Queue-Based Spin Locks with Timeout," 8th ACM PPoPP, 2001, pp. 1-9.

Herlihy, et al., "Transactional Memory: Architectural Support for Lock-Free Data Structures," Proc. 20th Annual International Symposium on Computer Architecture, pp. 289-300, May 1993.

Scherer, III, et al., "Advanced Contention Management for Dynamic Software Transactional Memory," Proc. of the 24th Annual ACM Symposium on Principles of Distributed Computing, 2005, pp. 240-248.

Guerraoui, et al., "Robust Contention Management in Software Transactional Memory," Proc. of the OOPSLA 2005 Workshop on Synchronization and Concurrency in Object-Oriented Languages, 2005, pp. 1-8.

Ansari, et al., "Adaptive Concurrency Control for Transactional Memory," 2008, pp. 1-12.

Attiya, et al., "Transactional contention management as a non-clairvoyant scheduling problem", ACM, 2006, pp. 308-315.

Rajwar, et al., "Speculative Lock Elision: Enabling Highly Concurrent Multithreaded Execution," Appears in the Proceedings of the 34th International Symposium on Microarchitecture (MICRO), Dec. 3-5, 2001, Austin, TX, pp. 1-12.

Rajwar, et al., "Transactional Lock-Free Execution of Lock-Based Programs," Appears in the Proc. of the 10th International Conf. on Architectural Support for Programming Languages and Operating Systems (ASPLOS), Oct. 6-9, 2002, San Jose, CA, pp. 1-13.

Martinez, et al., "Speculative Synchronization: Applying Thread-Level Speculation to Explicitly Parallel Applications," ASPLOS X 10;/02, San Jose, CA, 2002 ACM ISBN 1-58113-574-2/02/0010 . . . , pp. 1-12.

Hammond, et al., "Transactional Memory Coherence and Consistency," ISCA-31, 2004, pp. 1-12.

Posva, et al., "Speculative Locking—Breaking the Scale Barrier," JavaOne, Sun's 2005 Worldwide Java Developer Conference, pp. 1-37.

O. Agesen, et al., "An efficient meta-lock for implementing ubiquitous synchronization," ACM SIGPLAN International Conference on Object-Oriented Programming Systems, Languages and Applications (OOPSLA), 1999, pp. 1-30.

Dave Dice, "Implementing Fast Java Monitors with Relaxed-Locks," USENIX JVM'01, pp. 1-13.

Adam Welc, et al, "Transactional Monitors for Concurrent Objects," ECOOP'04, pp. 1-24.

Adam Welc, et al, "Transparently Reconciling Transactions with Locking For Java Synchronization," ECOOP'04, pp. 1-26.

Dice, et al., "Transactional Locking II," DISC 2006, pp. 1-15.

Wikipedia, "Carrier sense multiple access with collision detection," last updated Feb. 12, 2009, en.wikipedia.org/wiki/Carrier_sense_multiple_access_with_collision_detection, pp. 1-2.

Wikipedia, "Admission Control," last updated Dec. 14, 2008, en.wikipedia.org/wiki/Admission_control, 1 page.

Wikipedia, "Carrier sense multiple access with collision avoidance," last updated Feb. 14, 2009, en.wikipedia.org/wiki/Carrier_sense_multiple_access_with_collision_avoidance, pp. 1-14.

Keir Fraser, "Practical Lock-Freedom," Ph. D. Dissertation—King's College, Univerity of Cambridge, 2003. (Final version, Feb. 2004), pp. 1-116.

Wikipedia, "Truncated binary exponential backoff," last updated Apr. 13, 2008, en.wikipedia.org/wiki/Truncated_binary_exponential_backoff, 1 page.

U.S. Appl. No. 11/967,371, filed Dec. 31, 2007, Daniel S. Nussbaum, et al.

U.S. Appl. No. 12/327,659, filed Dec. 3, 2008, David Dice, et al.

U.S. Appl. No. 12/324,109, filed Nov. 26, 2008, David Dice, et al.

J. Mellor-Crummey and M. Scott, "Algorithms for scalable synchronization on shared-memory multiprocessors," ACM Transactions on Computer Systems, 9(1), 1991, pp. 1-42.

Lev, "PhTM: Phased Transactional Memory," Transact 2007, pp. 1-11.

Pang, et al., "Performance Evaluation of an Adaptive Backoff scheme for WLAN," Wireless Communications and Mobile Computing, 2004, pp. 1-13.

Yoo, et al., "Adaptive Transaction Scheduling for Transactional Memory Systems," Georgia Institute of Technology, CERCS;GIT-CERCS-07-04, pp. 1-25.

U.S. Appl. No. 12/325,870, filed Dec. 1, 2008, David Dice, et al.

Maurice Herlihy, et al., "Software Transactional Memory for Dynamic-Sized Data Structures," PODC 2003, Jul. 13-16, 2003, Boston, Massachusetts, USA. Copyright 2003 Sun Microsystems, Inc., pp. 1-10.

* cited by examiner

SYSTEM AND METHOD FOR EXECUTING A TRANSACTION USING PARALLEL CO-TRANSACTIONS

BACKGROUND

1. Field of the Disclosure

This disclosure relates generally to concurrent access to shared objects in a transactional memory system, and more particularly to a system and method for executing a transaction using parallel co-transactions such that at most one of them can succeed.

2. Description of the Related Art

The multi-core revolution currently in progress is making it increasingly important for applications to exploit concurrent execution in order to take advantage of advances in technology. Shared-memory systems allow multiple threads to access and operate on the same memory locations. To maintain consistency, threads must often execute a series of instructions as one atomic block, or critical section. In these cases, care must be taken to ensure that other threads do not observe memory values from a partial execution of such a block. Such assurances are important for practical and productive software development because without them, it can be extremely difficult to manage the interactions of concurrent threads. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include deadlock, priority inversions, software complexity, and performance limitations. Locking large sections of code and/or code that accesses a lot of data is a heavy-handed approach to concurrency control. Alternatively, it may be possible to increase parallelism by allowing multiple threads to execute a critical section at one time if the executions do not rely on overlapping memory locations. This may increase performance and mitigate many of the pitfalls normally associated with traditional locking mechanisms. However, such interleaved executions are not guaranteed to be correct.

Transactional memory is a mechanism that can be leveraged to enable concurrent and correct execution of a critical section by multiple threads. Transactional memory allows a thread to execute a block of instructions either completely and atomically or not at all. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or to be aborted, such that they have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs. In general, transactional memory can be implemented in hardware (HTM), in software (STM), or in any of a variety of hardware-assisted software implementations, some of which may be referred to as hybrid transactional memory implementations (HyTM).

Recently, there has been enormous interest in the use of atomic transactions to help make multithreaded programming easier. This goal is becoming more important due to the ongoing shift towards multi-core computing. While transaction-based techniques are promising for making multi-threaded programming easier, there are many challenges in implementing transactions efficiently.

SUMMARY

In some embodiments, the system described herein may include mechanisms to implement parallel co-transactions that access a shared memory. A set of transactions are said to be co-transactions if at most one of the transactions in the set will succeed and all other transactions in the set will fail (e.g., be aborted). In some embodiments, each co-transaction may execute on a different processor resource. For example, in one embodiment, each of the co-transactions may run on a different one of a plurality of cores in a multi-core system. In other embodiments, multiple co-transactions may run on the same core or processor, or on different processor chips in a system.

Co-transactions may in some embodiments be used to improve the performance of programs that use transactional memory by attempting to perform the same high-level operation (e.g., the same task, or similar tasks having the same high-level objective) using multiple algorithmic approaches, transactional memory implementations and/or speculation options in parallel, and allowing only the first to complete to commit its results. In other embodiments, each of the parallel co-transactions may perform a different task, only one of which is to be allowed to succeed and commit its results. If none of the co-transactions in a set succeeds, one or more of them may be retried, possibly using a different algorithmic approach, a different transactional memory implementation and/or different speculation options than those originally employed.

The system described herein may provide mechanisms to implement the use of such at-most-one parallel co-transactions, and may also provide simple and efficient implementations of the co-transactions themselves. Some embodiments described herein may guarantee that at most one co-transaction in a set can succeed and may minimize the potential for failures caused by interactions between the co-transactions. For example, in some embodiments, the at-most-one property may be managed through the use of a shared "done" flag. In such embodiments, the first co-transaction in a set to complete may set the value of a shared "done" flag to indicate that it has committed its results. The other co-transactions in the set may fail due to the induced conflict over this shared "done" flag or because they observe that the shared "done" flag is set before they begin executing the user code within the body of their transactions. Conflicts detected between co-transactions in a set and accesses made by other transactions or activities outside the set may be managed using lazy write ownership acquisition and/or a priority-based approach, in various embodiments.

Figure 1:
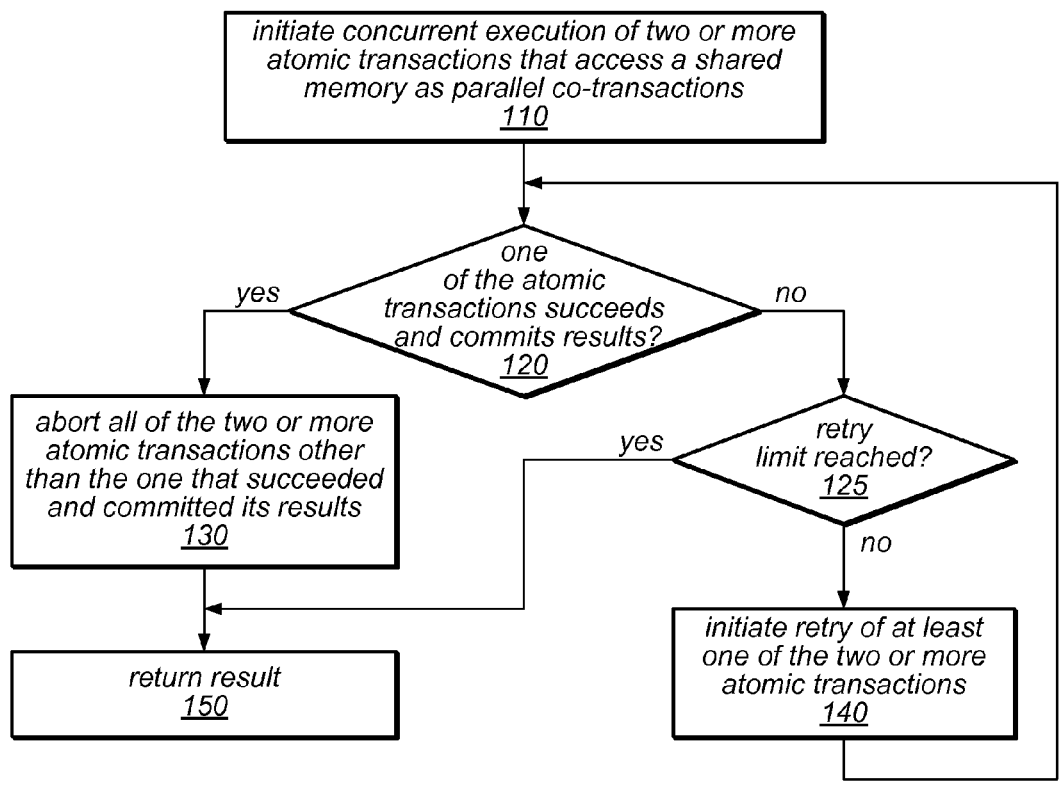
FIG. 1 is a flow diagram illustrating one embodiment of a method for implementing parallel co-transactions, at most one of which succeeds, as described herein.

While embodiments are described herein by way of example and with illustrative drawings, those skilled in the art will recognize that the disclosure is not limited to the embodiments or drawings described. It should be understood that the drawings and detailed description hereto are not intended to be limited to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As used herein, the term transaction may refer to a series of program instructions that may be executed together as an atomic operation. As described above, if the transaction succeeds (i.e. is successfully committed), then any resulting changes to shared memory may become visible to entities other than the actor. If a transaction does not succeed (i.e. is aborted), then the transaction attempt will have caused no change to any shared memory location. In other words, a transaction is a section of code that either appears to execute all at once (so that it does not observe concurrent changes by other threads, and so that other threads do not observe partial execution of the transaction), or to not execute at all. Read validation is a process by which software transactions check for consistency of the data with which they are executing, i.e. consistency between data read from a shared memory during execution of a given transaction. In various embodiments, different read validation techniques may be used to ensure that all reads remain consistent with one another while a transaction is executing, therefore preventing the transaction from performing erroneous operations (e.g., operations that cannot be undone) that would otherwise be impossible if executing atomically. A transaction may fail due to a conflict with another transaction or other activity by another thread (e.g., a conflict that causes the validation of the transaction's read set to fail), or for other reasons, such as exhausting an execution resource.

In some applications that employ transactions, each transaction may represent a separate high-level task to be performed. In such applications, if an executing thread attempts to perform a transaction and the transaction fails, the transaction may be retried repeatedly. In some embodiments, following the failure of a transaction attempt, the system may employ a back-off mechanism, or other contention control mechanisms and/or remediation techniques, in order to make subsequent attempts more likely to succeed. If a transaction fails repeatedly, a decision may be made to use a different transactional mode or mechanism in an attempt to make success more likely, or a decision may be made to give up on performing the high-level task within the body of an atomic transaction and to use a non-transactional mechanism to complete the high-level task, in different embodiments.

As noted above, while transaction-based techniques are promising for making multithreaded programming easier, there are several challenges in implementing transactions efficiently. These challenges include, but are not limited to: the challenge of selecting the best algorithm for performing a given high-level transaction, the challenge of selecting the best transactional memory implementation for implementing a given algorithm, and the challenge of whether and how to apply speculation mechanisms in a transaction, as described in more detail herein.

In general, there may be multiple different algorithms suitable for implementing a given high-level transaction. For example, a double-ended queue (deque) that supports an operation of the form "find and delete a node with key x" may be implemented using any of a variety of algorithms. One algorithm for performing this transaction may begin at one end of the deque, search for the key, and delete the first node with the key if one is found. Another algorithm for performing this transaction may be similar, except that it may begin its search at the other end of the deque. If keys in the deque are unique, then there may be no semantic difference between the two algorithms, in this example. However, in the general case, the two algorithms may access different locations in memory. Furthermore, if the keys are not unique, the two algorithms may result in different modifications to memory when and if they succeed. In this example, the two algorithms have different low-level semantics. However, at a higher level, the programmer may consider it acceptable to find and delete any node with key x. Therefore, either algorithm may be suitable to implement the desired operation. Another example of a class of operations to which different algorithms may be applied is a class of operations that involve parallel searches in graph structures for nodes satisfying a given condition. For this class of operations, different algorithms may begin searching at different nodes in the graph, perhaps chosen randomly. While in some cases it may be possible to determine in advance which of two or more algorithms will result in the best performance, in many cases it may be difficult or impossible to make such a determination.

Similarly, there may be multiple possible approaches that may be suitable for implementation of a given algorithm that performs a transaction. For example, it may be possible to implement a given transaction using hardware transactional memory (HTM) or using software transactional memory (STM). In general, HTM implementations may have much better performance, if they succeed, than STM implementations. On the other hand, STM implementations generally have fewer resource limitations, and thus may be used to successfully complete a larger class of transactions. In addition, STM implementations may be more flexible. For example, using an STM implementation that supports multiple contention management policies may allow for better adaptation to different workloads. As a result, in embodiments that provide both HTM and STM implementations, selection of an HTM or an STM implementation can have a dramatic impact on performance.

In some embodiments, it may be possible to implement a given HTM or STM using different, but semantically equivalent, strategies. For example, in some embodiments, a processor may provide one or more special instructions (e.g., "branch-on-register-not-ready", or brnr) that can be used to implement "speculation barriers". Such instructions may be used to stall speculation until a load miss is resolved, for example. Because a load miss may result in misspeculation (for example if a branch is mispredicted), the use of such speculation barriers may in some embodiments make a transaction more likely to succeed. However, such speculation barriers may also make the best-case execution time of the transaction higher (i.e. longer). Therefore, there may be additional overhead (cost) incurred when employing them in cases in which the transaction would have succeeded without them.

Other examples in which multiple transaction implementations may be suitable involve "incomplete" optimizations. For example, one implementation of an operation may be aggressively optimized for the common case, but may not handle all cases. When an unsupported case is encountered (which may be presumed to be an uncommon case), this implementation may simply kill (abort) the transaction. In some systems, if optimized, common-case code does not handle a particular case, a more general (but less optimized) version of the code may be employed in response to the failure of the optimized version, i.e. after the transaction has been attempted using the optimized code and the transaction has failed. In such systems, the time wasted in attempting to apply the optimization in cases when it is not effective may make the overall performance of the application worse than if no optimized versions were ever applied.

In various embodiments, one or more mechanisms may be provided for applying speculating when executing a transaction. In some cases, the system may be configured to begin executing a transaction before all of its inputs are known, in which case the system may be configured to speculate on the value (or on a range of possible values, or on other characteristics) of the inputs. For example, a transaction may be configured to speculate on whether a given value will be present in a hash table at a future logical time, and then to test for the value in the hash table when the logical time is reached, at which point it may either commit or abort based on whether or not the transaction speculated correctly. In another example, a transaction may be configured to speculate on the direction of a branch, and to subsequently verify that the direction taken was correct (aborting otherwise).

Typically, a system may address all of the issues described above by selecting one approach (e.g., selecting one algorithm, one transactional memory implementation, and/or one set of speculation options) and attempting to execute the transaction using that approach or that single combination of selected features. In such systems, if the transaction fails, then it may be re-executed, possibly using a different approach. For example, in a hardware-software hybrid transactional memory (HyTM) system, a transaction may be attempted using an HTM implementation, but if that does not succeed, the transaction may be retried using a compatible STM implementation. Unfortunately, this standard approach has significant disadvantages with respect to performance. In particular, this traditional approach may exhibit at least the following disadvantages:

Inflexibility: The system may be forced to choose one of a number of alternatives to attempt at a time. However, different runtime conditions may make different alternatives better at different times and/or for different workloads. Even if the system could accurately predict which alternative is best in each case (which is rarely possible), maintaining and querying runtime information to support such decisions may entail significant complexity and overhead.

Difficult tradeoffs: Different approaches may result vastly different performance, in some cases. For example, one of two alternatives for executing a given transaction may succeed in half the time of the other if it does succeed, but may be less likely to succeed. In this example, determining which alternative is best may depend on having reliable information about the relative likelihood of the two alternatives succeeding. This is because the time spent executing the faster alternative is wasted whenever it fails, according to the traditional approach of trying only one alternative at a time. Again, such information may be very difficult to obtain in traditional systems.

In some embodiments, the system described herein may include mechanisms to support the use of parallel co-transactions to improve performance of applications that include one or more code sequences to be executed as atomic transactions. The system may provide techniques that allow transactions to obtain the performance benefits of selecting a good approach (e.g., an optimal algorithm, transactional memory implementation, and/or set of speculative options) without paying the cost of sequentially trying different approaches.

As described herein, a set of transactions may be said to be co-transactions if at most one of them will succeed. Co-transactions may in some embodiments improve the performance of programs that use transactional memory by initiating multiple attempts to perform the same high-level operation in parallel. For example, each of the multiple parallel attempts to perform the task may employ different algorithmic approaches, different transactional memory types and/or implementations, and/or different types of speculation. In such embodiments, multiple co-transactions employing different combinations of such features may be thought of as "racing" each other, such that the desired result is obtained from the first approach to succeed and commit its results. In some embodiments, the system may guarantee that the "loser(s)" of the race do not commit (i.e. they may be aborted or caused to abort), so that the net semantic effect of executing a set of co-transactions is the same as the effect of executing just one of the alternative co-transactions.

The system described herein may provide mechanisms to implement the use of such at-most-one parallel co-transactions, and may also provide simple and efficient implementations of the co-transactions themselves. The example embodiments described herein may guarantee that at most one co-transaction in a set can succeed and may minimize the potential for failures caused by interactions between the co-transactions. In some embodiments, each of a set of multiple co-transactions may be run on a different processor resource. For example, in one embodiment, each of the co-transactions may run on a different one of a plurality of cores in a multi-core system. In other embodiments, multiple co-transactions may run on the same core or processor, or on different processor chips in a system.

A method for executing parallel co-transactions to improve performance of a program that includes atomic transactions is illustrated in FIG. 1, according to one embodiment. As illustrated at 110, the method may include initiating concurrent execution of two or more atomic transactions that access a shared memory as parallel co-transactions. Note that this does not necessarily mean that execution of all of the co-transactions in the set of co-transaction begins simultaneously, but that execution of the parallel transactions largely overlap each other, such that two or more of the transactions may attempt to access a shared memory at the same time. In different embodiments, the execution of a transaction as parallel co-transactions may be triggered by program code defining the as parallel transactions (as described in more detail herein) or the system may be configured to call multiple parallel routines that will attempt to execute a given transaction when the transaction is encountered in executing code. The system may be configured to schedule each of those parallel routines for execution at roughly the same time, and they may begin execution in a pre-defined or arbitrary order, in different embodiments.

In one example, the method illustrated in FIG. 1 may include initiating concurrent execution of two or more atomic transactions configured to perform the same task(s) using different algorithmic approaches, transactional memory mechanisms, and/or speculation options. In another example, the method may include initiating concurrent execution of any set of atomic transactions for which at most one of the transactions will be allowed to commit its results. In this example, two or more of these co-transactions may be configured to perform different tasks using the same or different algorithmic approaches, transactional memory mechanisms, and/or speculation options. As illustrated in FIG. 1, if one of the atomic actions succeeds and commits its results, shown as the positive exit from 120, the method may include aborting all of the other atomic transactions in the set of transactions executing as parallel co-transactions, as in 130. In other words, the method illustrated in FIG. 1 may guarantee that at most one of the parallel co-transactions in the set succeeds by aborting all other transactions in the set once any of one of the co-transactions succeeds.

On the other hand, if none of the co-transactions succeed (shown as the negative exit from 120), and if a retry limit has not yet been reached (shown as the negative exit from 125), the method may include initiating the retry of at least one of the parallel co-transactions, as in 140. In some embodiments, following the failure of all of the parallel co-transactions, the system may employ a back-off mechanism, or other contention control mechanisms and/or remediation techniques, in order to make subsequent attempts of one or more of the co-transactions more likely to succeed. In various embodiments, a pre-determined retry limit may be defined for the transactional memory system, or a retry limit may be configurable in the user code that includes the transaction, or in code that implements a contention manager for the system. In embodiments that include a retry limit, until the retry limit is met (or exceeded) or one of the parallel co-transactions succeeds, the method may include retrying at least one of the atomic transactions in the set of parallel co-transactions. In some embodiments, when one or more of the parallel co-transactions is retried, they may be retried using the same algorithmic approaches, transactional memory mechanisms, and speculation options that were employed in previous, failed attempt(s). In other embodiments, when one or more of the parallel co-transactions is retried, they may be retried using different algorithmic approaches, transactional memory mechanisms, and/or speculation options than those employed in previous, failed attempt(s).

As illustrated by the example in FIG. 1, the method may include returning an indication of success or failure of the parallel co-transactions, as in 150. For example, if one of the co-transactions has succeeded (shown as the path through 120, 130, and 150) or if none of the one of the parallel co-transactions has succeeded prior to reaching a pre-determined retry limit (shown as the path from the positive exit of 125 to 150), a result indicator may be returned to the program that initiated the execution of the parallel co-transactions and its value may reflect the success or failure of the attempt to successfully execute one of the co-transactions in the set. Note that in some embodiments, one or more co-transactions may be retried using the same or different algorithmic approaches, transactional memory mechanisms, and/or speculation options until a pre-determined retry limit has been reached, after which (if none of the co-transactions has succeeded) one or more of the co-transactions may be retried using a default approach and/or a transactional memory mechanism that may be guaranteed to succeed, but for which the performance may not be particularly good (not shown).

Figure 2:
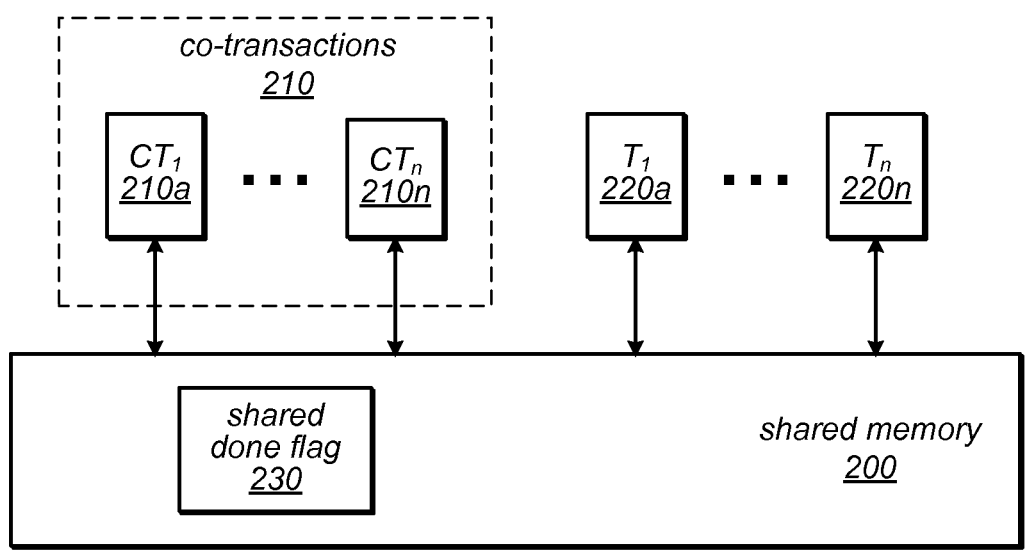
FIG. 2 is a block diagram illustrating a portion of a computer system in which a plurality of concurrently executing transactions accesses a shared memory, according to one embodiment.

The system and methods described herein may be further illustrated by way of the example block diagram depicted in FIG. 2. As shown in this example, two or more atomic transactions 210 (e.g., 210a-210n) may execute concurrently as a set of parallel co-transactions ($CT_1$-$CT_n$) that access a shared memory 200. Note that shared memory 200 includes a location storing a shared "done" flag 230, an example of which is described in more detail later. In some embodiments, one or more other transactions $T_1$-$T_n$ (illustrated as 220a-220n) that also access shared memory 200 but that are not a part of the set of co-transactions 210 may be executing concurrently in the system. Note that in some embodiments, multiple sets of parallel co-transactions may be executing concurrently within the system, and at most one transaction in each set of co-transactions may be able to commit its results. Methods for detecting and managing potential or actual conflicts between co-transactions 210 and other transactions 220 are discussed in more detail below, according to various embodiments.

In some embodiments, the system may employ a combination of a "best-effort" HTM, special software code, and various conventions to implement parallel co-transactions. As described above, the system may be configured to guarantee that at most one co-transaction in a set can succeed. This guarantee may not require special hardware support beyond traditional best-effort HTM. For example, in one embodiment, this guarantee may be achieved through the use of a simple software protocol by adding a special variable called "done" that is shared between the co-transactions in a set. The done variable may be checked within each co-transaction and may be set by a successful co-transaction, as is shown in the following pseudo code example. In this example, transactions are expressed using a generic "atomic" block, but a similar approach may be employed in a variety of contexts in which transactions are used.

```
bool done = false;
    T1                    T2
    atomic {              atomic {
    if (done) abort;      if (done) abort;
    <t1>                  <t2>
    done = true;          done = true;
    }                     }
```

In shown in the example pseudo code above, both co-transactions read and write "done". Therefore, they cannot both commit their results, either because of the induced conflict over "done", or because if one of the co-transactions completes before the other co-transaction starts, then the second co-transaction to start will abort itself in response to observing "done" as true. Note that a given set of co-transactions must all use the same "done" variable, while different independent sets of co-transactions may each use their own "done" variable. Also note that this notion may in some embodiments be extended so that a single "done" variable may be used by a set of threads to perform successive sets of co-transactions, e.g., by associating a unique ID with each such set, initializing "done" to that ID prior to executing the set of co-transactions, attempting to change "done" to a different value within each co-transaction, and aborting if "done" does not equal that ID. Note that in some embodiments, the execution of multiple sets of co-transactions (all of which may access the same shared memory) may overlap. As noted above, in some such embodiments, each set of co-transactions may share a different "done" flag. In other embodiments, a transaction may be included in more than one set of co-transactions and may include more than one "done" flag in its read set and/or write set. In this case, the transaction cannot commit unless none of the other co-transactions in the sets to which it belong do not commit (i.e. unless none of the other transactions set any of its "done" flags).

Figure 3A:
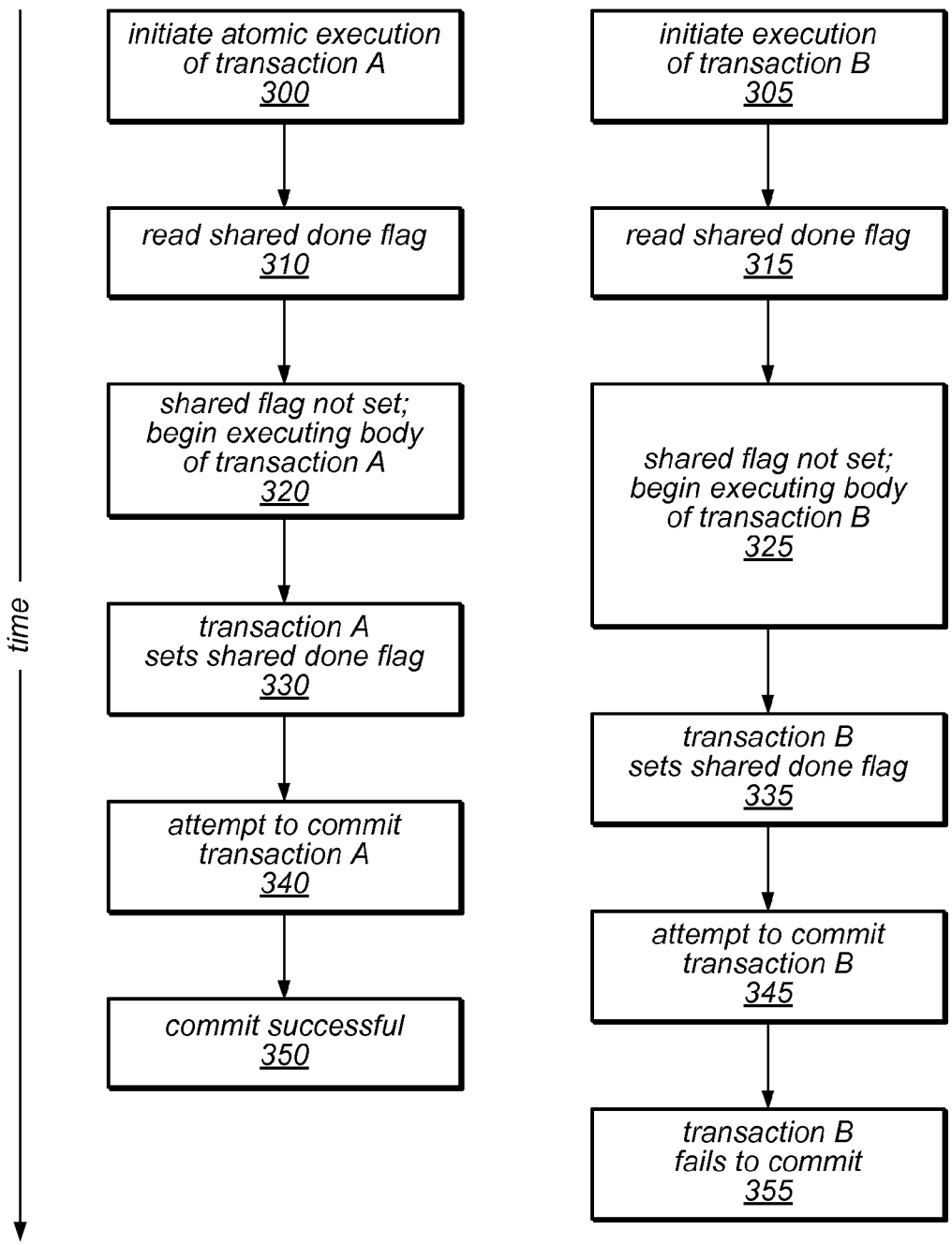
FIGS. 3A and 3B are flow diagrams illustrating one embodiment of a method for managing contention between transactions using a shared "done" flag, as described herein.
Figure 3B:
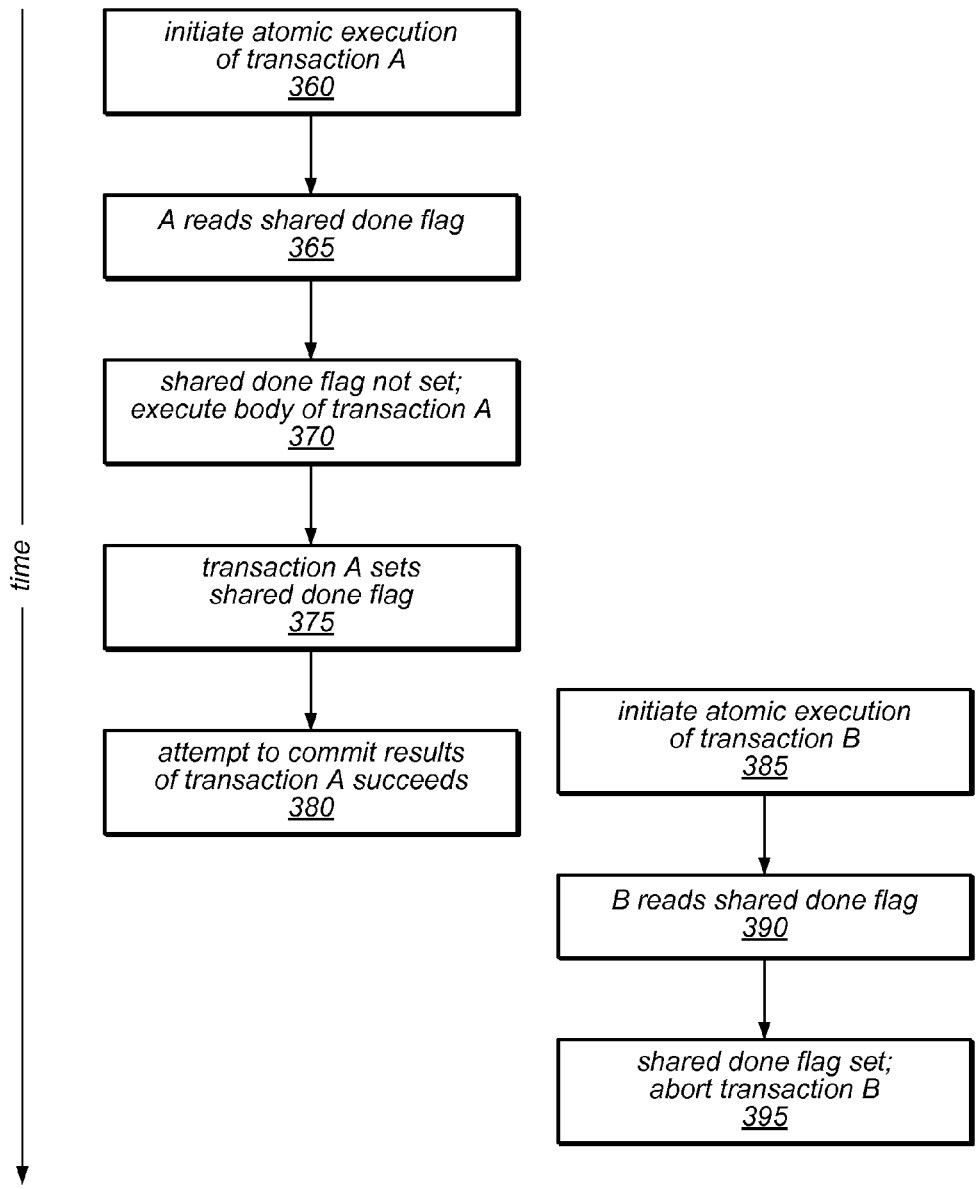

The methods described herein may be further illustrated by way of the following examples. FIGS. 3A and 3B illustrate the effect of these two cases when executing two parallel co-transactions, according to some embodiments. In the examples illustrated in FIGS. 3A and 3B, transactions A and B are executed as parallel co-transactions in a set of co-transactions that share a "done" flag and each of which includes one or more accesses to a shared memory. The progress of transaction A is shown on the left side of each figure, and the progress of transaction B is shown on the right side of each figure, with time advancing from the top to the bottom of the figure. Note that the progression of time depicted in FIGS. 3A and 3B is merely illustrative, and these figures are not drawn to any particular time scale.

In the example illustrated in FIG. 3A, only one of the two transactions can commit its results due to an induced conflict over the shared "done" flag. In this example, the execution of transaction A and the execution of transaction B, shown as elements 300 and 305, respectively, are initiated at approximately the same time. For example, they may be scheduled for execution on two different processor cores, both of which are (or become) available for execution within an amount of time much less than the amount of time it would take to execute each of the transactions. In this example, transactions A and B may execute at least a portion of the body of their transactions (e.g., the user code of their transactions) concurrently. This is shown in FIG. 3A by the fact that the two transactions read a shared "done" flag at approximately the same time (at 310 and 315), and (finding that the shared flag is not set) the two transactions begin executing the body of their transactions at approximately the same time (at 320 and 325). Note that in some embodiments, reading the shared flag may result in recording the read of the shared flag in an entry of the read set of each transaction, while other read operations performed within the co-transactions A and B may not result in an entry in the transactions' read sets.

In the example illustrated in FIG. 3A, the execution of the body of transaction A is completed earlier than the execution of the body of transaction B. This may be due to any number of reasons including, but not limited to, the transactions including different numbers of tasks; the transactions performing different numbers of shared memory accesses; the transactions performing similar tasks, but employing different algorithmic approaches, different types of transactional memory (e.g., hardware transactional memory vs. software or hybrid transactional memory), different transactional memory implementations, and/or speculation options; or differences in the performance and/or capabilities of the different processing cores on which each transaction executes. In the example illustrated in FIG. 3A, the execution of transaction A completes (which may include completing all of its reads and locally buffered writes) before that of transaction B, and at that point, transaction A sets the shared "done" flag (shown at 330). In some embodiments, transaction A may write to this shared flag using a locally buffered write operation within its atomic transaction code. In this example, the execution of transaction B completes after the execution of transaction A has been completed, at which point transaction B writes to the shared "done" flag (e.g., using a locally buffered write operation within its atomic transaction code). This is shown at 335.

In the example illustrated in FIG. 3A, after recording the setting of the "done" flag with a locally buffered write operation, transaction A attempts to commit its results (as in 340). In this example, committing results of transaction A includes performing a write back operation to update the "done" flag in shared memory based on the locally buffered write operation performed within the code of atomic transaction A. In this example, since transaction B has not yet written to this location in shared memory, this attempt to commit results is successful (as in 350). On the other hand, after transaction B records the setting of the "done" flag with a locally buffered write operation (as in 335) and attempts to commit its results (as in 345), the conflict between transactions A and B over the shared "done" flag (which has been induced through the reading and subsequent writing of the shared flag) causes transaction B to fail to commit, as in 355. In other words, when transaction B attempts to commit its results, it detects that the "done" flag has been updated in shared memory by another transaction (transaction A, in this case), and since the "done" flag is in the read set of transaction B, transaction B cannot commit its results. Note that similar results may be obtained if transaction B begins later than transaction A, as long as the "done" flag has not yet been set by transaction A when transaction B starts.

In the example illustrated in FIG. 3B, the execution of transaction A (shown at 360) is initiated well before the execution of transaction B (shown at 385). In fact, in this example, the execution of transaction B is not initiated until after transaction A has read the shared "done" flag (as in 365), executed the body of transaction A in response to determining that the shared "done" flag was not set (as in 370), and set the shared "done" flag (as in 375). In this example, when transaction B reads the shared "done" flag (at 390), it finds that the shared "done" flag is set (i.e. that it has been set by transaction A). Therefore, transaction B is aborted, as shown in 395. In this example, after setting the shared "done" flag, transaction A commits its results, as in 380. In other words, in this example, since no other transaction includes the shared "done" flag in its read or write set, the attempt to commit the results of transaction A is successful.

As discussed above, in some embodiments at least some of the co-transactions executing concurrently in the system may employ different algorithmic approaches, different types of transactional memory (e.g., hardware transactional memory, software transactional memory, or a hybrid of hardware transactional memory, where multiple types are supported), different transactional memory mechanisms, and/or different speculation options. In some embodiments, by initiating concurrent execution of parallel co-transactions that employ different combinations of algorithmic approaches, different transactional memory types or transactional memory mechanisms, and/or different speculation options, an application that includes one or more code sequences to be executed as an atomic transaction may take advantage of the benefits of any of these combinations without having to try different combinations in multiple successive (i.e. serial) attempts. In other words, by implementing parallel co-transactions, the system described herein may not waste time trying an approach that may be faster when it succeeds, but that might not succeed, at which point the system may have to retry the transaction using another approach.

Figure 4:
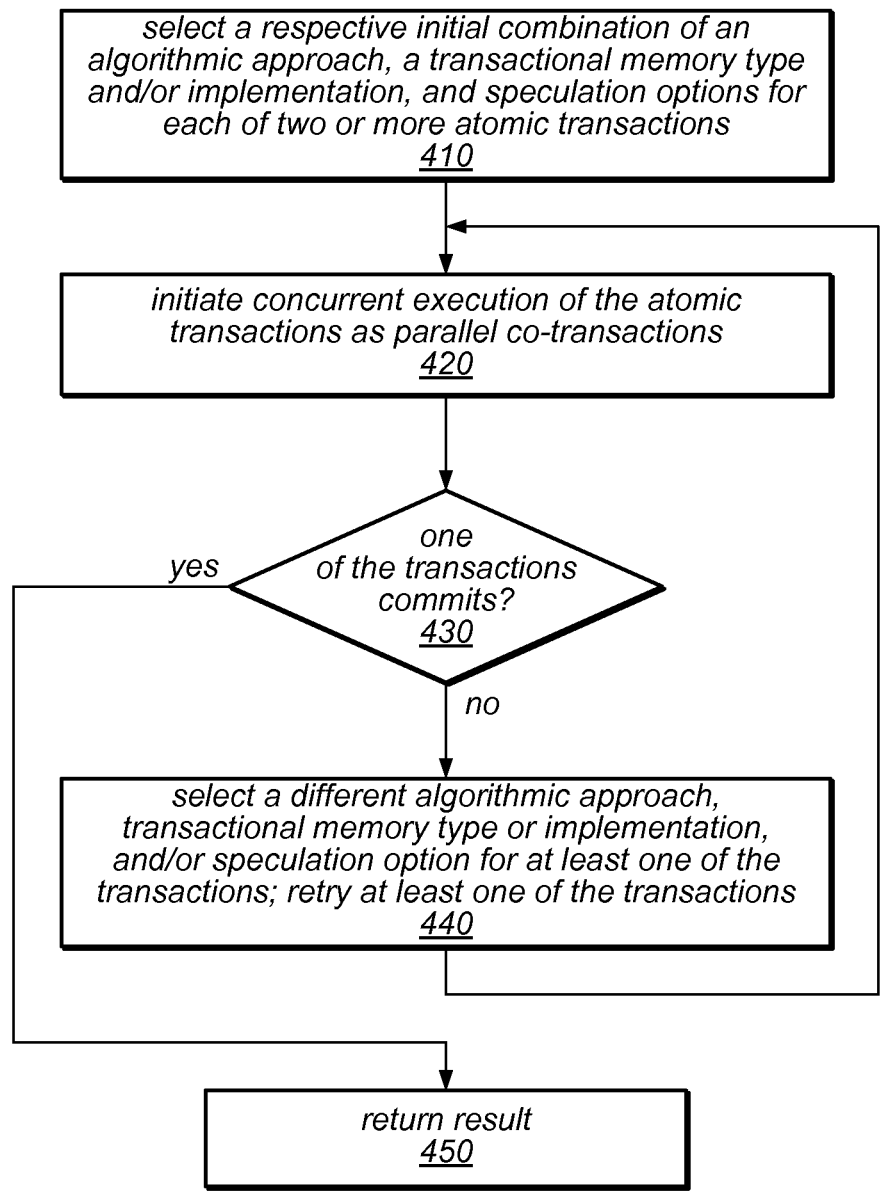
FIG. 4 is a flow diagram illustrating one embodiment of a method for implementing parallel co-transactions that employ different algorithmic approaches, transactional memory types or implementations, and/or speculation options, as described herein.

FIG. 4 illustrates a method for employing different combinations of algorithmic approaches, transactional memory types or transactional memory mechanisms, and speculation options in an attempt to improve performance of an application that includes atomic transactions, according to one embodiment. As illustrated in this example, the method may include selecting a respective initial combination of an algorithmic approach, a transactional memory type and/or implementation, and various speculation options for each of two or more atomic transactions that access a shared memory, as shown in 410.

As illustrated in this example, the method may include initiating concurrent execution of the two or more atomic transactions as parallel co-transactions (e.g., initiating their execution on different processor cores), as in 420. If one of the atomic transactions successfully commits its results, shown as the positive exit from 430, the method may include returning a result indicator to the program that initiated the execution of the parallel co-transactions, as in 450. For example, the value of the result indicator may reflect the success of an attempt to successfully execute one of the parallel co-transactions in the set.

As illustrated in FIG. 4, if none of the parallel co-transactions successfully commits its results, shown as the negative exit from 430, the method may include selecting a different algorithmic approach, a different transactional memory type or implementation, and/or different speculation options for at least one of the transactions in the set of parallel co-transactions, and retrying at least one of the parallel co-transactions, as in 440. In some embodiments, only those co-transactions for which different algorithmic approaches, transactional memory types or implementations, and/or speculation options are selected may be retried. In other embodiments, one or more co-transactions may be retried using different algorithmic approaches, transactional memory types or implementations, and/or speculation options than originally employed while one or more other co-transactions may be retried using the algorithmic approaches, transactional memory types or implementations, and speculation options originally employed. In various embodiments, the operations illustrated as 420-440 in FIG. 4 may be repeated until one of the co-transactions succeeds, or until a pre-determined retry limit is reached (e.g., until such a limit is met or exceeded). If a pre-determined retry limit is reached before any of the co-transactions succeeds, the method may include returning a result indicator to the program that initiated the execution of the parallel co-transactions (not shown). In this case, the value of the result indicator may reflect the failure of an attempt to successfully execute one of the parallel co-transactions in the set.

In order to have an efficient implementation of co-transactions, the system may need to address the ability of one co-transaction in a set to conflict with, and thus cause the failure of, other co-transactions in the set. In cases in which the co-transactions are all attempting to perform the same high-level operation, it is likely that some of them will attempt to read or write a memory location that is being written by another co-transaction in the same set. Because such conflicts are likely in such cases, they may have a significant detrimental effect on performance. On the other hand, because the system may guarantee that at most one co-transaction in a set can succeed, there may be no need to detect conflicts between co-transactions within a set (other than conflicts on the "done" variable), although there may still be a need to detect conflicts with accesses performed by code outside the given set of co-transactions (i.e., co-transactions from another set, other transactions, or non-transactional accesses).

Figure 5:
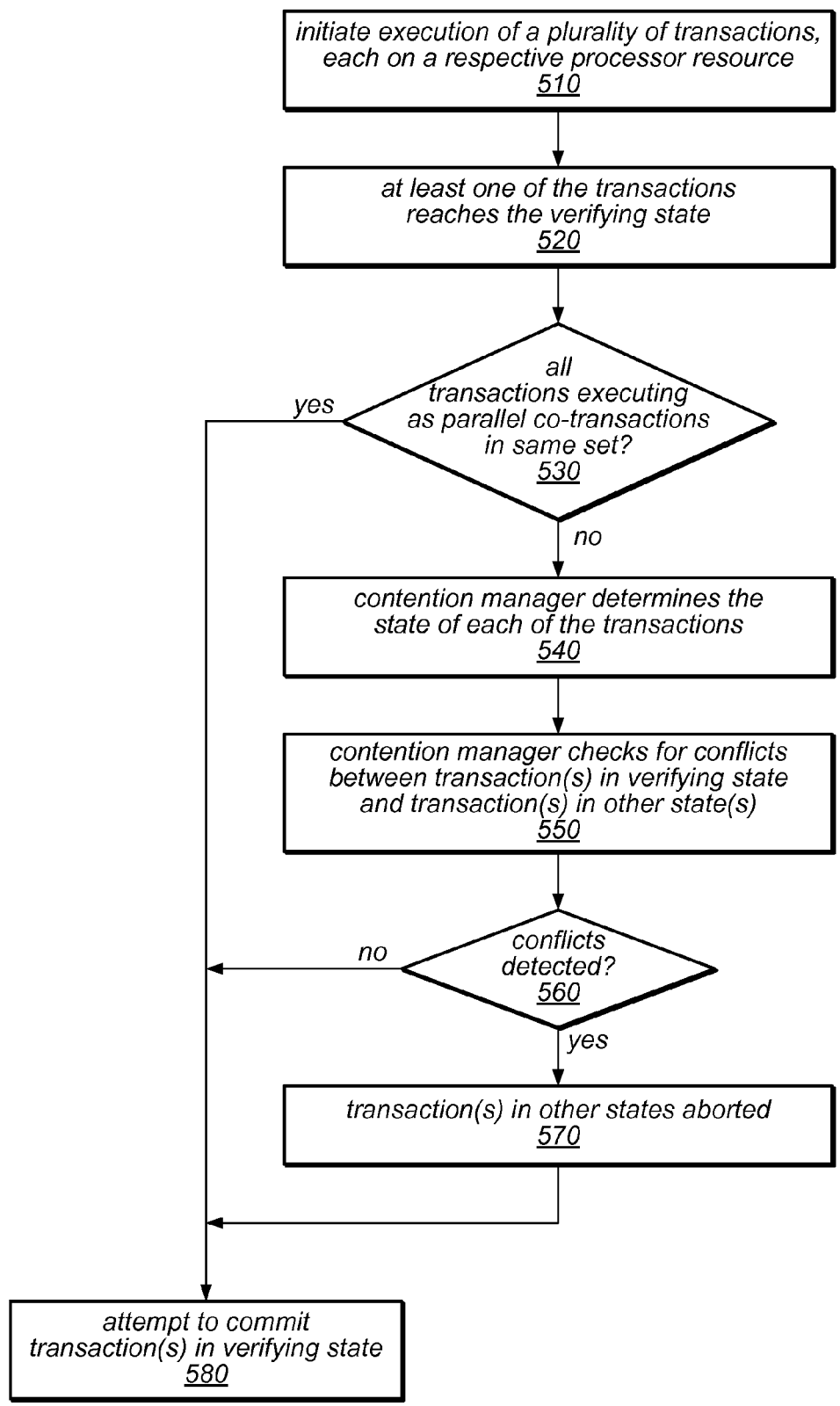
FIG. 5 is a flow diagram illustrating one embodiment of a method for detecting and managing conflicts between transactions, some of which may be executing as parallel co-transactions, as described herein.

FIG. 5 illustrates one embodiment of a method for detecting and resolving conflicts between transactions in a system that supports parallel co-transactions, as described herein. As illustrated at 510 in this example, the method may include initiating concurrent execution of a plurality of transactions, each on a respective processor resource. As previously noted, this does not necessarily mean that execution of all of the transactions begins simultaneously, but that their executions overlap such that two or more of the transactions may attempt to access the shared memory at the same time. When at least one of the transactions reaches a verifying state, shown at 520, the method may include determining whether all of the currently executing transactions are executing as parallel co-transactions in the same set of co-transactions, as in 530. If so, shown as the positive exit from 530, there may be no need to detect conflicts between the transactions (other than conflicts on a shared "done" flag, as described herein). Therefore, the method may continue with an attempt to commit the one or more co-transactions in the set that are in the verifying state, as in 580.

As illustrated in this example, if not all of the currently executing transactions are executing as co-transactions in the same set of transactions as a transaction in the verifying state (e.g., if one or more transactions are executing as stand-alone transactions, or as co-transactions in another set of transactions), shown as the negative exit from 530, the method may include a contention manager (or other component of the system) determining the state of each of the currently executing transactions, as in 540. The contention manager may then check for conflicts between each transaction in a verifying state and any other transactions that are not in the same set of co-transactions as that transaction and that are in other states (e.g., a reading state, or a committing state), as in 550. If conflicts are not detected between any one or more of the transactions in the verifying state and other transactions, shown as the negative exit from 560, the method may include attempting to commit those transactions that are in the verifying state, as in 580. If, on the other hand, conflicts are detected between any one or more of the transactions in the verifying state and other transactions, shown as the positive exit from 560, the method may include aborting the conflicting transactions (i.e. transactions that are not in the verifying state, but that conflict with one or more transactions that are in the verifying state), as in 570, and then attempting to commit the transactions that are in the verifying state, as in 580.

As described above, in some embodiments a given co-transaction may not abort another co-transaction in the same set unless the given transaction is about to commit (i.e. unless it is finished executing its user code—the body of the transaction). However, if conflicts are detected between any of the co-transactions within a set and transactions outside the set, this may cause one or more transactions to be aborted (i.e. to fail). Therefore, the system may need to detect conflicts between shared memory accesses performed by a co-transaction within a give set and accesses performed by code outside the given set of co-transactions (i.e., co-transactions from another set, other transactions, or non-transactional accesses). In some embodiments these issues may be addressed by employing lazy write ownership acquisition and/or priority-based contention management, as described below.

In various STM implementations, conflicts between transactions may be detected based on a cache-line-sized unit of transactional consistency. However, in other embodiments, the methods described herein may be applicable when other units of transactional consistency are used.

In some embodiments, each transaction may progress through a sequence of phases, denoted as "reading", "verifying", and "committing". In an initial reading phase, a transaction may read shared state, may locally buffer all writes, and may satisfy subsequent reads of locations thus written out of its local buffer. Note that the term "lazy acquisition" refers to the fact that a transaction in a reading phase and performing locally buffered writes does not yet acquire write ownership of locations in a shared memory. In a system that employs lazy write ownership acquisition, one thread (T) can perform a local write to a location concurrently with another thread (S) having a shared (read-only) copy of the same location in its cache without S losing its read-only copy. Similarly, S and T may both write the location in common, without either of them failing before completing their respective reading phase. In such systems, a transaction may not attempt to acquire write ownership of a target location in a shared system memory until it reaches the verifying phase.

Figure 6:
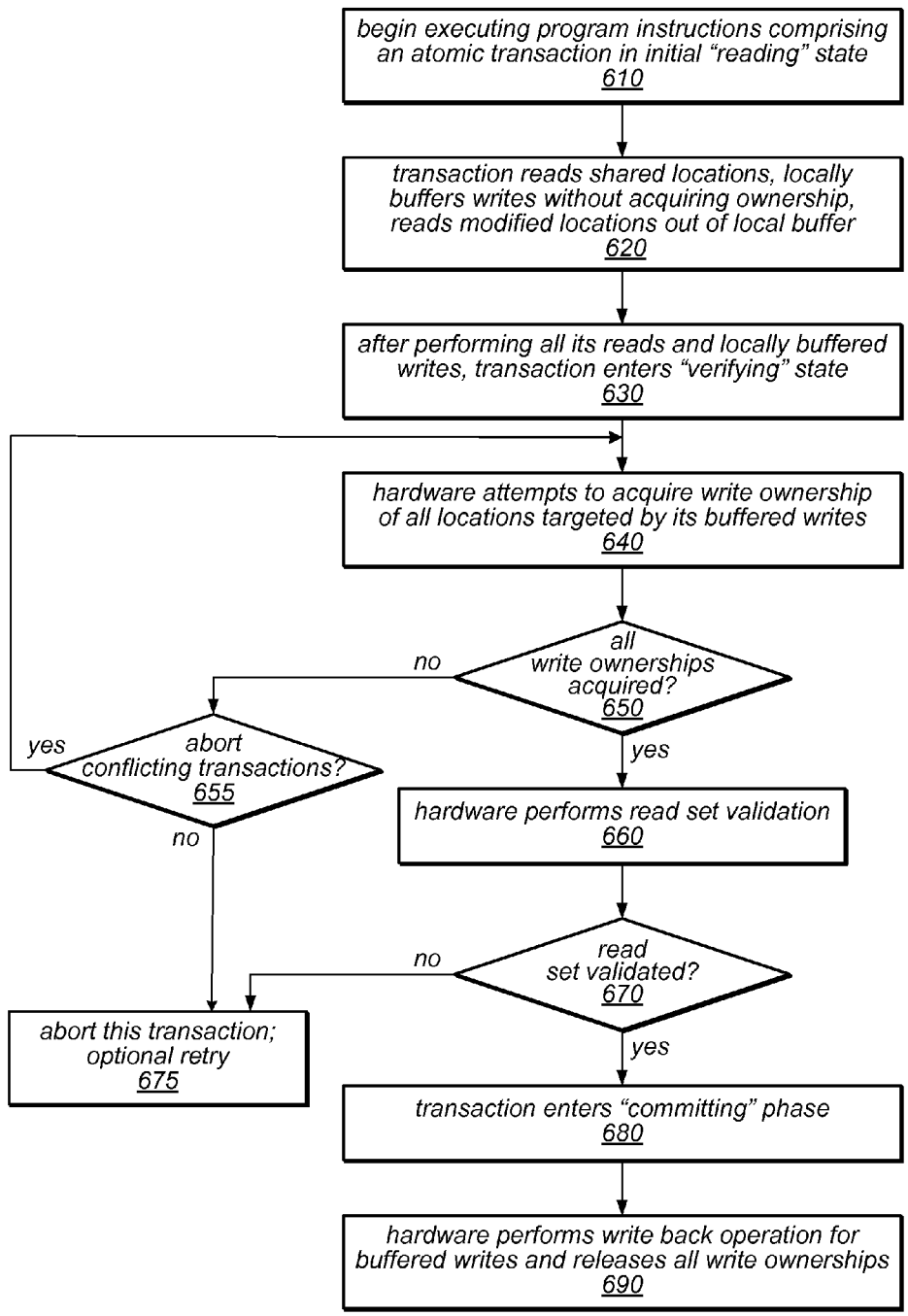
FIG. 6 is a flow diagram illustrating one embodiment of a method for managing contention between transactions using lazy write ownership acquisition, as described herein.

FIG. 6 illustrates a method for detecting conflicts between shared memory accesses performed by a transaction within a given set of co-transactions and accesses performed by code outside the given set of co-transactions (e.g., code within co-transactions from another set, code in other transactions, or code that performs non-transactional accesses) using lazy acquisition of write ownership, according to one embodiment. As illustrated in this example, the method may begin by executing program instructions comprising one or more memory access operations to a shared memory within an atomic transaction in an initial "reading" state, as in 610. As described above, while in a reading state, a transaction may read locations in the shared memory, and may locally buffer write accesses targeting locations in the shared memory without acquiring write ownership of those locations, as in 620. Subsequent reads of locations modified by a write access of the transaction may be read out of the local buffer, in this example.

As illustrated in this example, once the transaction reaches the point at which it has performed all of its read accesses and has locally buffered all of its write accesses, the method may include the transaction entering its "verifying" phase, as in 630. In this phase, the method may include hardware (in systems that include best-effort HTM) scanning through all of the buffered write accesses of the transaction, and attempting to obtain (and hold) exclusive write ownership of each of them, as in 640. If not all of these write ownerships are successfully acquired, shown as the negative exit from 650, the method may include aborting this transaction, or aborting one or more conflicting transaction(s), according to various contention management mechanisms that may be employed in the system to resolve such conflicts. For example, in some embodiments, one or more other transactions may be aborted (shown as the positive exit from 655) and the transaction may continue to attempt to acquire all of the write ownerships for the writes buffered by the transaction (e.g., repeating the operations illustrated in 640 and 650). In other embodiments, if the transaction itself is aborted (shown as the path from the negative exit from 655 to 675), it may be subsequently retried (e.g., according to a back-off mechanism), assuming a retry limit has not been reached or exceeded. In still other embodiments, other contention management mechanisms may be employed in the case of such contention (not shown).

As illustrated in this example, if the hardware is successful in obtaining and holding write ownership for all writes buffered by the transaction, the method may include the hardware validating the read set of the transaction, e.g., the hardware may confirms that the transaction holds read ownership (which may be a shared read ownership) for all locations read during the reading phase, as in 660. Read set validation may be performed in a variety of ways, in different embodiment. In one embodiment, the reading phase may mark cache lines containing locations in the transaction's read set as speculatively read. In such embodiments, validating the read set may be achieved simply by confirming that no cache line so marked has been evicted or invalidated since being read.

As illustrated in this example, if the read set is not successfully validated, shown as the negative exit from 670, the method may include aborting the transaction (as in 675), and may also include retrying the transaction. If, on the other hand, the hardware successfully acquires ownership of locations written by the transaction and subsequently validates the transaction's read set, the method may include the hardware entering the "committing" phase, as in 680. As illustrated in this example, in this phase, the method may include the hardware performing a write back operation to update each of the locations in the shared memory targeted by write access operations, as reflected in the locally buffered writes, and then releasing write ownership of those locations, as in 690. In other words, the method may include the transaction "draining" all of the buffered writes to the shared memory and releasing write ownership. Note that in some such embodiments, a transaction may be aborted at any time until it enters the committing phase, but once a transaction enters the committing phase, it may be guaranteed to complete successfully.

In some embodiments, a priority-based contention management approach may be employed to detect and/or resolve conflicts between co-transactions and other transactions executing concurrently in the system. This approach may in some embodiments provide a conflict resolution mechanism that avoids deadlock and live lock between transactions that have reached the verifying phase. In some such embodiments, each transaction within a set may be assigned a unique priority. Various mechanisms may be used to assign priorities, including but not limited to assigning them based the value of a local timer, on the value of a local counter that is incremented in response to every successful local transaction, on the value of a global clock, or on the value of a global transaction counter. In some embodiments, if the priority scheme does not directly ensure that priorities are unique, ties may be broken based on a thread ID or other distinguishing feature. In some embodiments, a transaction that fails may use the same priority assigned to it initially if it is re-executed (i.e. retried), while in other embodiments, a re-prioritization of transactions (or co-transactions) may be performed before retrying one of more failed transactions.

Figure 7:
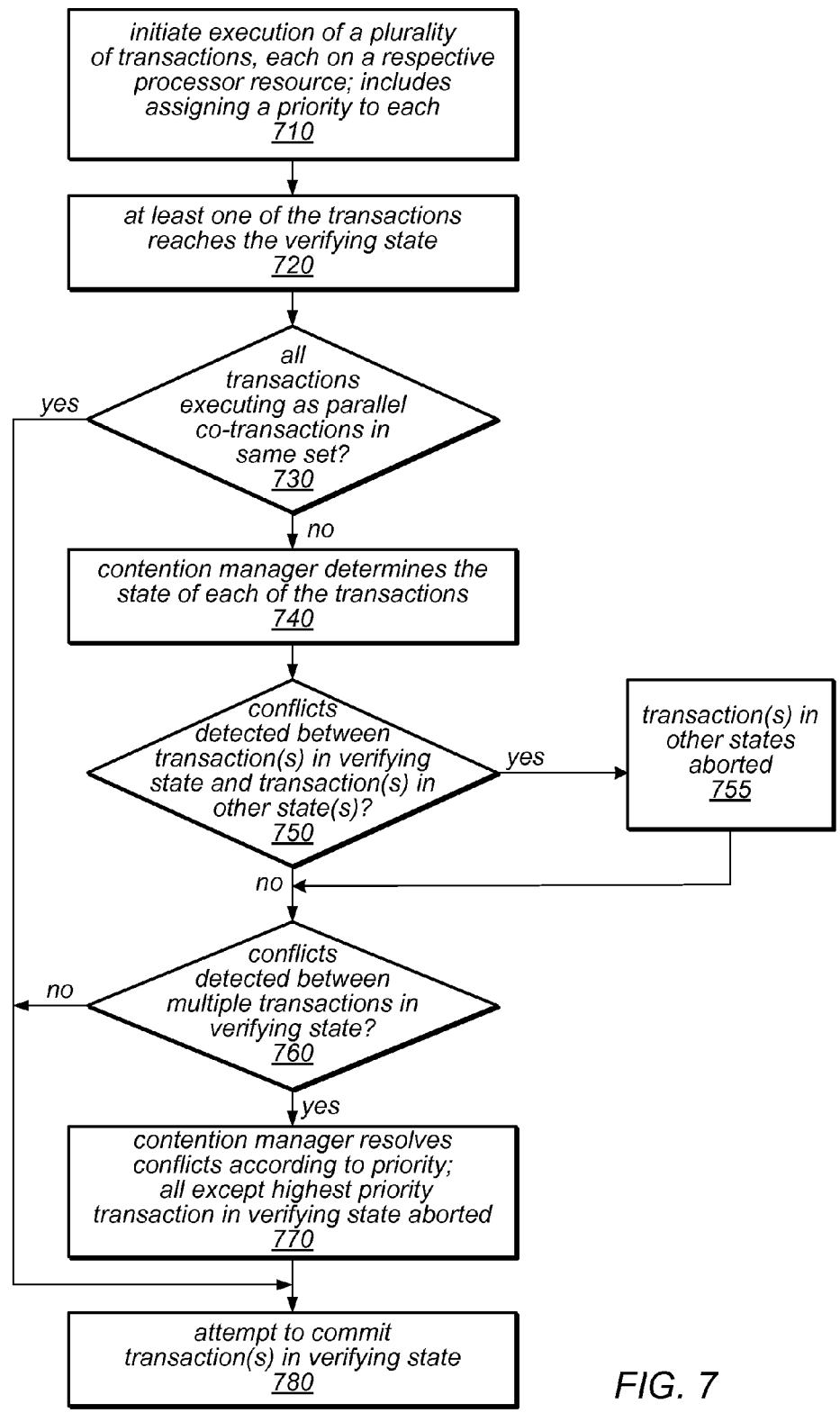
FIG. 7 is a flow diagram illustrating one embodiment of a method for managing contention between transactions according to priorities previously assigned to the transactions, as described herein.

A method for resolving conflicts based on assigned priorities is illustrated in FIG. 7, according to one embodiment. As illustrated in this example, the method may include initiating execution of a plurality of transactions, each on a respective processor resource, as in 710. In some embodiments, this may include assigning a priority to each transaction. The transactions may include two or more co-transactions in each of one or more sets of co-transactions, and may also include transactions that are not part of a set of co-transactions. As illustrated in this example, when at least one of the transactions reaches the verifying state (shown at 720), the method may include determining whether all of the transactions currently executing in the system are executing as parallel co-transactions in the same set, as in 730. If so, shown as the positive exit from 730, there may be no need to detect conflicts between the transactions (other than conflicts on a shared "done" flag, as described herein). Therefore, the method may continue with an attempt to commit the one or more co-transactions in the set that are in the verifying state, as in 780.

As illustrated in this example, if not all of the currently executing transactions are executing as co-transactions in the same set of transactions as a transaction in the verifying state (e.g., if one or more transactions are executing as stand-alone transactions, or as co-transactions in another set of transactions), shown as the negative exit from 730, the method may include a contention manager (or other component of the system) determining the state of each of the currently executing transactions, as in 740. The contention manager (or a conflict detection mechanism thereof) may then check for conflicts between each transaction in a verifying state and any other transactions that are not in the same set of co-transactions as that transaction and that are in other states (e.g., a reading state, or a committing state), as in 750. If conflicts are not detected between any one or more of the transactions in the verifying state and other transactions, shown as the negative exit from 760, the method may include attempting to commit those transactions that are in the verifying state, as in 780. If, on the other hand, conflicts are detected between any one or more of the transactions in the verifying state and other transactions, shown as the positive exit from 760, the method may include aborting the conflicting transactions (i.e. transactions that are not in the verifying state, but that conflict with one or more transactions that are in the verifying state), as in 755, and then determining whether there are any conflicts between the transactions that are in the verifying state, as in 760.

As illustrated in this example, the method may also include the contention manager (or a conflict detection mechanism thereof) determining whether there are any conflicts between multiple transactions that are in the verifying state, as in 760. If not, shown as the positive exit from 760, the method may include attempting to commit the transactions that are in the verifying state, as in 780. If conflicts are detected between multiple transactions in the verifying state, shown as the positive exit from 760, the method may include the contention manager (or other component) resolving those conflicts according to their assigned priority, as in 770. For example, in one embodiment, the method may include aborting all transactions in the verifying state other than the one with the highest priority, and then attempting to commit the transaction with the highest priority, as in 780.

Note that in this example, conflicting transactions may be aborted as soon as they are detected. However, in other embodiments, conflicting transactions in the verifying state or in other states may not be aborted until it is clear that the attempt to commit the current transaction will succeed. For example, in some embodiments employing hardware mechanisms, once the current transaction has successfully acquired write ownership for all of the writes buffered by the transaction, the attempt to commit the transaction may be guaranteed to succeed. In other embodiments (e.g., in software implementations), read-set consistency may also need to be verified before a successful attempt to commit the current transaction is guaranteed. Therefore, in some embodiments, rather than aborting other transactions as soon as a conflict is detected, a transaction may collect a list of other transactions that may need to be aborted (e.g., a "will abort list"). In such embodiments, the transactions on the "will abort list" may not be aborted until or unless it is determined that the attempt to commit the current transaction will eventually succeed. Note also that while the conflict detection mechanism is described as a component of a contention manager in this example, in other embodiments, conflicts between transactions may be detected by a conflict detection mechanism that is separate from the contention manager, and the contention manager may be configured to resolve any conflicts detected by the conflict detection mechanism.

In this example, priorities may only be used to resolve conflicts between transactions that are both in the verifying phase. In this case, the higher priority transaction may be allowed to continue and the lower priority transaction may fail (e.g., it may be aborted). Other conflicts are resolved as follows. If a transaction that is not in the committing phase conflicts with a transaction that is in the committing phase, the transaction that is not in the committing phase may fail, regardless of the priorities of either of the transactions. Similarly, if a transaction in the reading phase conflicts with a transaction in the verifying phase, the transaction in the reading phase may fail, regardless of the priorities of either of the transactions. Note that in some embodiments, it may be impossible for two transactions in the committing phase to conflict (because they will have already obtained all necessary read and write ownerships prior to entering the committing phase), and it may be impossible for two transactions in the reading phase to detect a conflict. This is because they may only obtain read permission (i.e. shared read ownership) in the reading phase, and two attempts to obtain read permission cannot cause a conflict. Note that in some embodiments, both lazy write ownership acquisition and pre-assigned priorities may be employed to manage contention in a system that implements the parallel co-transactions described herein.

The system and methods described herein may be further illustrated using the following detailed example, according to one embodiment. In this example, it may be assumed that each thread executes on a separate core, and that each core has a private L1 cache. In this example, each line in the L1 cache can be in one of several coherence states, including: modified (M), indicating the line is readable and writable; shared (S), indicating the line is readable but not writable; and Invalid (I), indicating the line is neither readable nor writable. In this example, it may also be assumed that each core has a store queue for buffering write access operations to a shared memory and that each core includes a write-back L1 cache.

In addition to the traditional hardware mechanisms described above, in this example it may be assumed that the hardware includes a means for check-pointing the architectural state of the processor, e.g., for check-pointing the architectural state of each core in a multi-core processor. Furthermore, it may be assumed that each line in the L1 cache includes two extra flags, referred to as R and W, denoting that the line has been transactionally read or written, respectively. In addition, each core may include a phase register (whose value may reflect whether a transaction executing on the core is in a standard, reading, verifying, or committing phase), and a priority register, which may hold the priority of the transaction currently executing on the core (if there is one). In this example, in addition to the standard coherence messages RTS (used for obtaining an S copy of a line) and RTO (used for obtaining an M copy of a line), the coherence protocol may be augmented to support two additional coherence messages: TRTS (used for obtaining an S copy of a line within a transaction) and TRTO (used for obtaining an M copy of a line within a transaction). In this example, the TRTO coherence message (but not the TRTS coherence message) may include the priority of the requesting transaction.

Figure 8:
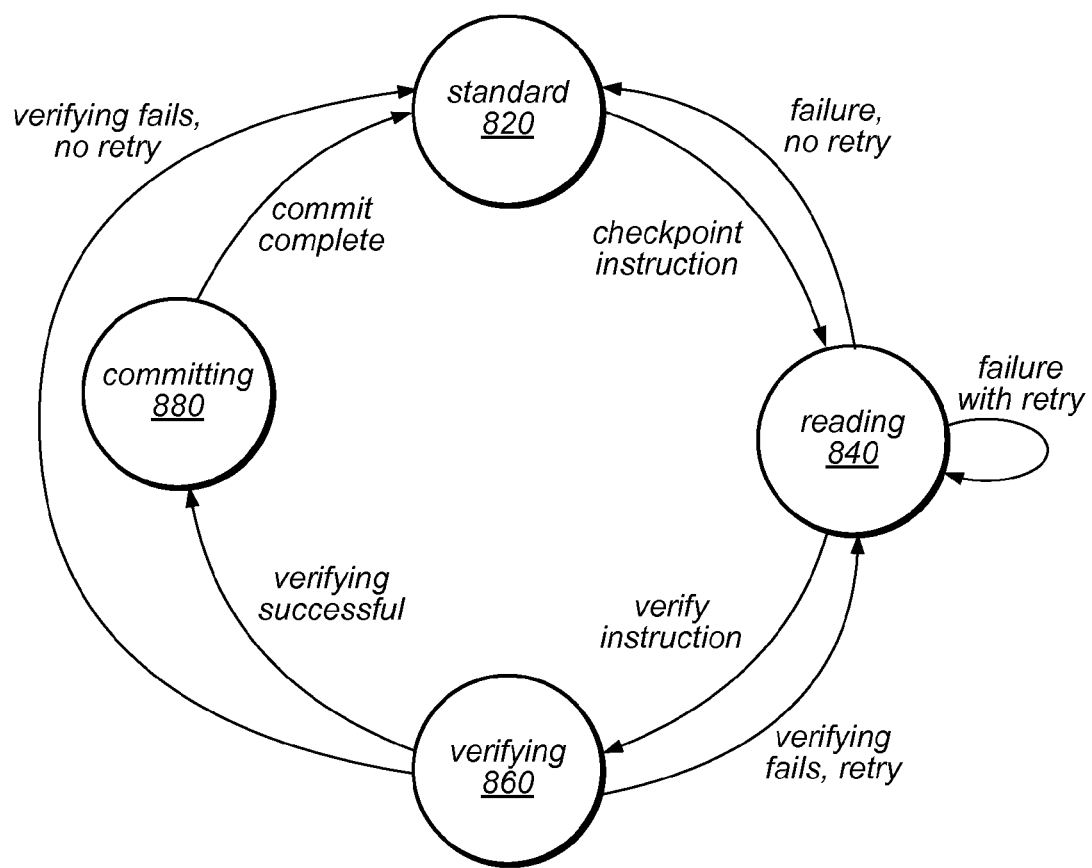
FIG. 8 illustrates one embodiment of a state diagram for a phase register of a processor core executing a transaction, as described herein.

The phases through which a transaction (or co-transaction) may pass in a system that includes the hardware support described above may be further illustrated by the state diagram in FIG. 8. This diagram illustrates the transitions between the phases reflected in the phase register of each processor core during execution of a transaction, according to one embodiment. As illustrated in this example, execution of a transaction on a given core may be initiated by a CHECKPOINT instruction. In this example, this instruction may cause the hardware to check-point the architectural state and to transition the phase register from the standard state (820) to the reading state (840). In this example, while the core is executing in a reading phase, all loads may use TRTS messages to obtain readable copies of cache lines and reading a cache lines may cause its R flag to be set. As described below, the response to a TRTS message may be a NACK (i.e. a negative acknowledgment), indicating that the requestor has not been granted the requested read permission. In this case, the requesting transaction fails. In some embodiments, if a cache line in which the R flag is set encounters an RTO or TRTO message while the core is executing in a reading phase, the RTO or TRTO message may be handled normally (i.e. without returning a NACK) and the local transaction in the reading phase fails. As described herein, stores (i.e. write operations) performed within a reading phase may be placed in a store queue, but they may not cause coherence messages and may not update the L1 cache.

As illustrated in FIG. 8, once the reading phase is complete, software may execute a VERIFY instruction, which may cause the hardware to transition the phase register from the reading state (840) to the verifying state (860). During the verifying phase, the hardware may scan through the store queue and, for each store, may use a TRTO message to obtain a writable copy of the targeted cache line, and may set the W flag for that line. In some embodiments, if a TRTO message encounters a cache line in a different core for which the R and/or W flag is set, and that different core is in a verifying phase, previously assigned priorities may be used to resolve the conflict. For example, if the TRTO message includes an indication that the corresponding transaction has a higher priority than that of a conflicting transaction, it may be handled normally (i.e. without returning a NACK) and any lower priority transaction(s) may fail. On the other hand, if the TRTO message includes an indication that the corresponding transaction has a lower priority than that of a conflicting transaction, it may receive a NACK and the lower priority transaction may fail.

Throughout the verifying phase, as in the reading phase, if a cache line in which the R flag set encounters an RTO or TRTO message while the core is in a reading phase, the RTO or TRTO message may be handled normally (i.e. without returning a NACK) and the local transaction in the reading phase may fail. Thus, if the verifying phase is completed successfully without the transaction failing, the transaction must hold all read permissions and write ownerships needed to complete the transaction.

As illustrated in FIG. 8, once the hardware has successfully completed the verifying phase, it may transition the phase register from a verifying state (860) to a committing state (880). At this point, if any RTS, RTO, TRTS, or TRTO message is received that conflicts with a cache line for which the R and/or W flag is set in the committing core, the message may receive a NACK or it may be delayed, in various embodiments. Note that, in some embodiments, it may be possible to delay without causing deadlock because the amount of time spent by hardware in the committing phase is bounded. In some embodiments, while in the committing phase, the hardware may scan through the store queue and, for each store, may update the L1 cache to reflect the previously buffered store. In some such embodiments, once all stores have been processed, the commit is complete. At this point, the hardware may be configured to clear the R and W flags in that L1 cache and to transition the phase register from a committing state (880) to a standard state (820), to reflect the fact that the transaction has been successfully completed.

In some embodiments, if the transaction fails for any reason, the hardware may restore the check-pointed state, record the reason for failure, and jump to failure handling code (which may be located at an address specified in the CHECKPOINT instruction, for some processors). If the failure was due to detection of a "done" flag with the wrong value, or if the failure was due to exhausting a private resource, the transaction may not be retried. However, if the failure was due to a conflict, the transaction may be retried. FIG. 8 illustrates various failures with retries and failures for which no retry is attempted.

Note that if co-transactions fail only due to resource limitations and contention with other co-transactions in the same set, and if each co-transaction has private resources, then the implementation described above may yield the following progress property: If at least one co-transaction in a set of co-transactions would succeed when run alone, then at least one co-transaction in the set will succeed when they are run together. Although this property relies on the use of private resources, in some embodiments in which resources are shared, a combination of lazy write ownership acquisition and priority-based contention management may also yield good performance and progress, in practice.

Note that while the methods described herein may be implemented in systems that include hardware transactional memory, they may be equally applicable to software-only transactional memory, i.e. without special hardware support.

While in some of the examples described herein, the system may avoid conflicts between co-transactions in the same set by delaying acquisition of write ownership until after the reading phase is completed, in other embodiments, conflicts between co-transactions of the same set may be treated specially, so that, although detected, such conflicts do not cause transactions to fail. In some embodiments, atomicity may be guaranteed for the at most one successful co-transaction of a set despite ignoring such conflicts because of the mechanism used to ensure that at most one of them succeeds (e.g., a shared the "done" flag, as described above). Some such embodiments may have an advantage in that they can request write ownership "eagerly" (i.e., during the reading phase). However, unlike in the example described in detail above, such systems may require conflicts to be treated differently depending on whether or not they are between co-transactions in the same set. Therefore, the implementation may be required to be able to distinguish these cases, for example by associating each co-transaction with a set ID, or using any of a variety of other approaches for distinguishing these cases.

Although several of the examples described herein assume that co-transactions are coordinated explicitly by different threads, a variety of interfaces are possible. For example, with macros or with specific language support, programmers may in some embodiments express co-transactions without managing their interaction explicitly. In one such embodiment, the example above in which <t1> and <t2> are executed as co-transactions may be expressed follows:

```
atomic {
    <t1>
    ||
    <t2>
}
```

In this example, the system (e.g., the compiler and/or runtime and/or hardware) may be responsible for ensuring the at-most-one-succeeds property. For example, this property may be guaranteed by allocating a variable to play the role of the "done" flag in the previous example, and arranging for appropriate synchronization on it to ensure that at most one of the co-transactions can succeed. Note that while in many of the examples described herein, each co-transaction in a set of transactions may be configured to perform the same task (i.e. all of the co-transactions in a set may have the same objective), the methods described herein may also be applied to any set of co-transactions for which at most one of the co-transactions is to be allowed to succeed, regardless of whether the tasks they are configured to perform are similar (or related) or not.

Figure 9:
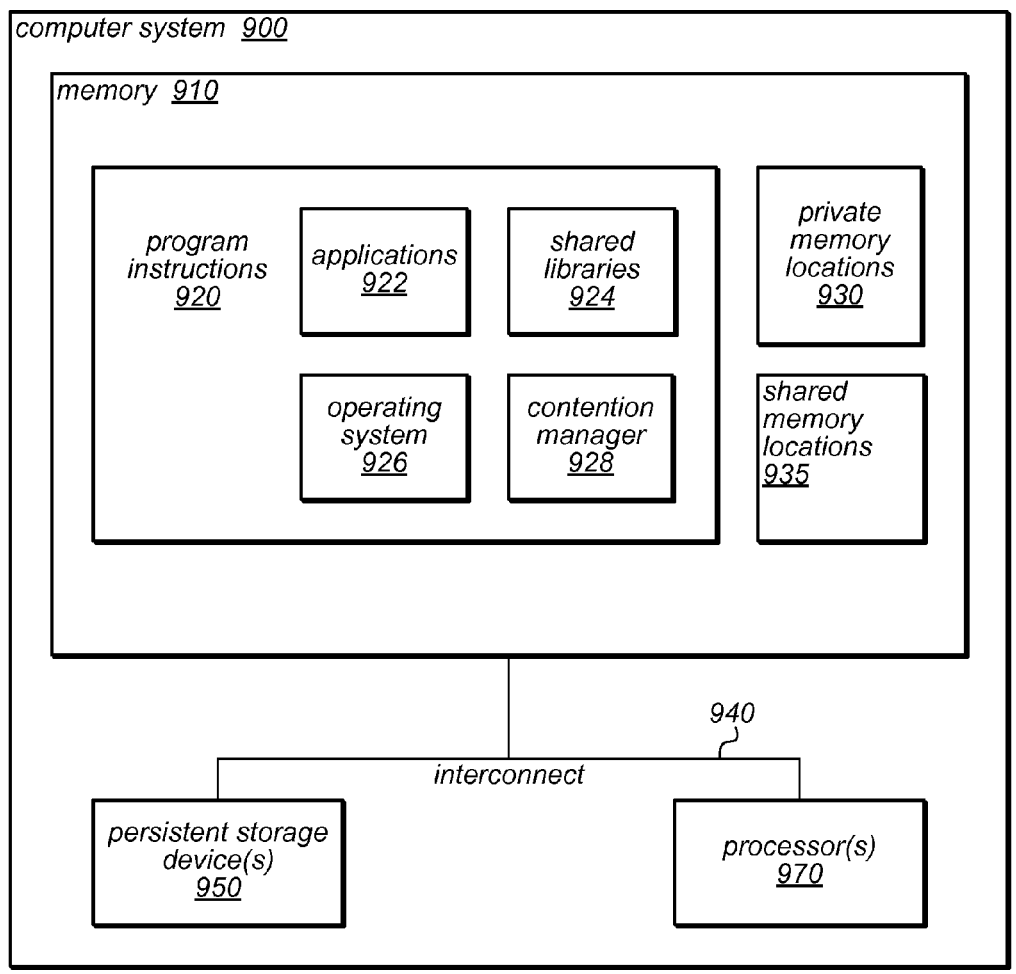
FIG. 9 is a block diagram illustrating a computer system configured to implement parallel co-transactions, according to various embodiments.

FIG. 9 illustrates a computing system configured to implement the methods described herein, according to various embodiments. The computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for providing transactional memory described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 900 may include one or more processors 970; each may include multiple cores, any of which may be single or multi-threaded. The computer system 900 may also include one or more persistent storage devices 950 (e.g. optical storage, magnetic storage, hard drive, tape drive, solid state memory, etc) and one or more memories 910 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 970, the storage device(s) 950, and the system memory 910 may be coupled to the system interconnect 940. One or more of the system memories 910 may contain program instructions 920. Program instructions 920 may be executable to implement one or more applications 922, shared libraries 924, operating systems 926, and/or contention managers 928, as described herein. Program instructions 920 may be encoded in platform native binary, any interpreted language such as Java™ byte-code, or in any other language such as C/C++, Java™, etc or in any combination thereof. The program instructions 820 may include transactional memory support configured to provide functions, operations and/or other processes for implementing parallel co-transactions, as described herein. Such support and functions may exist in one or more of the shared libraries 924, operating systems 926, contention managers 928, or applications 922, in various embodiments. The system memory may further comprise private memory locations 930 and/or shared memory locations 935 where data may be stored. For example, these locations may store data in one or more shared done flags, one or more ownership records, one or more read ownership arrays, one or more thread-local read-write conflict indicators, a global read-write conflict counter, one or more data structures configured to store metadata (e.g., snapshots) associated with read access operations (i.e. a read set or invisible reads subset thereof), and/or other data structures accessible to a plurality of concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of a hybrid transactional memory system, it should be noted that the techniques and mechanisms disclosed herein may be applicable in other contexts in which transactions are used, including software transactional memory and/or hardware transactional memory. It is intended that the following claims be interpreted to embrace all such variations and modifications.

What is claimed:

1. A method, comprising:
   using a computer to perform:
      initiating concurrent execution of two or more different code sequences, each of which is executable to perform a respective task as an atomic transaction, wherein each of the atomic transactions is a transaction in a set of co-transactions, wherein at most one of the atomic transactions in the set of co-transactions is to be allowed to succeed and commit its results, and wherein each of the two or more code sequences comprises one or more memory access operations to locations in a shared memory that is accessible to a plurality of concurrently executing transactions;
      committing results of at most one of the atomic transactions being performed by the two or more code sequences; and
      aborting all of the atomic transactions being performed by the two or more code sequences other than the at most one of the atomic transactions for which results are committed, wherein aborted ones of the atomic transactions in the set of co-transactions are not subsequently retried if results of one of the atomic transactions being performed by the two or more code sequences have been committed.

2. The method of claim 1, wherein the respective tasks to be performed by all of the two or more code sequences as atomic transactions have the same objective.

3. The method of claim 1, wherein at least two of the atomic transactions employ different transactional memory implementations or different speculation options.

4. The method of claim 1, further comprising:
in response to none of the transactions committing their results, initiating a retry of the execution of at least one of the two or more code sequences.

5. The method of claim 1,
wherein said committing comprises setting a value of a shared indicator that is accessible to all of the two or more code sequences to indicate that the at most one of the atomic transactions has committed its results; and
wherein said aborting is performed in response to detecting that the shared indicator was set to indicate that the at most one of the atomic transactions has committed its results.

6. The method of claim 1,
wherein executing the two or more code sequences comprises locally buffering any write access operations in the respective atomic transactions that target locations in the shared memory without modifying the targeted locations in the shared memory; and
wherein said committing comprises modifying the locations targeted in the shared memory to reflect the locally buffered write access operations performed by the at most one of the two or more code sequences.

7. The method of claim 1, further comprising:
a conflict detection mechanism determining whether there are any conflicts between the two or more code sequences and one or more concurrently executing transactions other than the atomic transactions being performed by the two or more code sequences.

8. The method of claim 1, wherein said initiating comprises initiating execution of each of the two or mode code sequences on a different processor resource.

9. A system comprising:
one or more processors; and
a memory coupled to the one or more processors and storing program instructions executable by the one or more processors to cause the one or more processors to perform:
initiating concurrent execution of two or more different code sequences, each of which is executable to perform a respective task as an atomic transaction, wherein each of the atomic transactions is a transaction in a set of co-transactions, wherein at most one of the atomic transactions in the set of co-transactions is to be allowed to succeed and commit its results, and wherein each of the two or more code sequences comprises one or more memory access operations to locations in a shared memory that is accessible to a plurality of concurrently executing transactions;
committing results of at most one of the atomic transactions being performed by the two or more code sequences; and
aborting all of the atomic transactions being performed by the two or more code sequences other than the at most one of the atomic transactions for which results are committed, wherein aborted ones of the atomic transactions in the set of co-transactions are not subsequently retried if results of one of the atomic transactions being performed by the two or more code sequences have been committed.

10. The system of claim 9, wherein at least two of the atomic transactions employ different transactional memory implementations or different speculation options.

11. The system of claim 9, wherein the program instructions are further executable by the one or more processors to cause the one or more processors to perform:
in response to none of the transactions committing their results, initiating a retry of the execution of at least one of the two or more code sequences.

12. The system of claim 9,
wherein said committing comprises setting a value of a shared indicator that is accessible to all of the two or more code sequences to indicate that the at most one of the atomic transactions has committed its results; and
wherein said aborting is performed in response to detecting that the shared indicator was set to indicate that the at most one of the atomic transactions has committed its results.

13. The system of claim 9,
memory access operations to locations in a shared memory that is accessible to a plurality of concurrently executing transactions;
committing results of at most one of the atomic transactions being performed by the two or more code sequences; and
aborting all of the atomic transactions being performed by the two or more code sequences other than the at most one of the atomic transactions for which results are committed, wherein aborted ones of the atomic transactions in the set of co-transactions are not subsequently retried if results of one of the atomic transactions being performed by the two or more code sequences have been committed.

14. The system of claim 9, wherein the program instructions are further executable by the one or more processors to cause the one or more processors to perform:
determining whether there are any conflicts between the two or more code sequences and one or more concurrently executing transactions other than the atomic transactions being performed by the two or more code sequences.

15. The system of claim 9, wherein said initiating comprises initiating execution of each of the two or more code sequences on a different processor resource.

16. A computer readable storage medium storing program instructions computer-executable to perform:
initiating concurrent execution of two or more different code sequences, each of which is executable to perform a respective task as an atomic transaction, wherein each of the atomic transactions is a transaction in a set of co-transactions, wherein at most one of the atomic transactions in the set of co-transactions is to be allowed to succeed and commit its results, and wherein each of the two or more code sequences comprises one or more transactions has committed its results.

17. The storage medium of claim 16, wherein at least two of the atomic transactions employ different transactional memory implementations or different speculation options.

18. The storage medium of claim 16, wherein the program instructions are further computer-executable to perform:
in response to none of the transactions committing their results, initiating a retry of the execution of at least one of the two or more code sequences.

19. The storage medium of claim 16,
wherein said committing comprises setting a value of a shared indicator that is accessible to all of the two or more code sequences to indicate that the at most one of the atomic transactions has committed its results; and wherein said aborting is performed in response to detecting that the shared indicator was set to indicate that the at most one of the atomic wherein executing the two or more code sequences comprises locally buffering any write access operations in the respective atomic transactions that target locations in the shared memory without modifying the targeted locations in the shared memory; and wherein said committing comprises modifying the locations targeted in the shared memory to reflect the locally buffered write access operations performed by the at most one of the two or more code sequences.

20. The storage medium of claim 16, wherein executing the two or more code sequences comprises locally buffering any write access operations in the respective atomic transactions that target locations in the shared memory without modifying the targeted locations in the shared memory; and wherein said committing comprises modifying the locations targeted in the shared memory to reflect the locally buffered write access operations performed by the at most one of the two or more code sequences.

* * * * *

UNITED STATES PATENT AND TRADEMARK OFFICE
CERTIFICATE OF CORRECTION

PATENT NO.          : 8,464,261 B2
APPLICATION NO.     : 12/750901
DATED               : June 11, 2013
INVENTOR(S)         : Mark S. Moir, Robert E. Cypher and Daniel S. Nussbaum It is certified that error appears in the above-identified patent and that said Letters Patent is hereby corrected as shown below:

In The Claims:

Column 22, starting at line 16, please delete entire claim 13 and insert the following in place thereof:

--13. (Currently amended) The system of claim 9, wherein executing the two or more code sequences comprises locally buffering any write access operations in the respective atomic transactions that target locations in the shared memory without modifying the targeted locations in the shared memory; and wherein said committing comprises modifying the locations targeted in the shared memory to reflect the locally buffered write access operations performed by the at most one of the two or more code sequences.--

Column 22, starting at line 14, please delete entire claim 16 and insert the following in place thereof:

--16. (Currently amended) A computer readable storage medium storing program instructions computer-executable to perform:

initiating concurrent execution of two or more different code sequences, each of which is executable to perform a respective task as an atomic transaction, wherein each of the Signed and Sealed this
Thirtieth Day of July, 2013

Teresa Stanek Rea
*Acting Director of the United States Patent and Trademark Office* atomic transactions is a transaction in a set of co-transactions, wherein at most one of the atomic transactions in the set of co-transactions is to be allowed to succeed and commit its results, and wherein each of the two or more code sequences comprises one or more memory access operations to locations in a shared memory that is accessible to a plurality of concurrently executing transactions;

committing results of at most one of the atomic transactions being performed by the two or more code sequences; and aborting all of the atomic transactions being performed by the two or more code sequences other than the at most one of the atomic transactions for which results are committed, wherein aborted ones of the atomic transactions in the set of co-transactions are not subsequently retried if results of one of the atomic transactions being performed by the two or more code sequences have been committed.--

Columns 22-23, starting at line 63, please delete entire claim 19 and insert the following in place thereof:

--19. (Currently amended) The storage medium of claim 16, wherein said committing comprises setting a value of a shared indicator that is accessible to all of the two or more code sequences to indicate that the at most one of the atomic transactions has committed its results; and wherein said aborting is performed in response to detecting that the shared indicator was set to indicate that the at most one of the atomic transactions has committed its results.--

UNITED STATES PATENT AND TRADEMARK OFFICE
CERTIFICATE OF CORRECTION

| | | |
|---|---|---|
| PATENT NO. | : 8,464,261 B2 | Page 1 of 1 |
| APPLICATION NO. | : 12/750901 | |
| DATED | : June 11, 2013 | |
| INVENTOR(S) | : Moir et al. | |

It is certified that error appears in the above-identified patent and that said Letters Patent is hereby corrected as shown below:

On Title page 2, column 2, item (56) under Other Publications, line 26, Delete "Univerity" and insert -- University --, therefor.

In the Specification,

In column 12, line 65, delete "give" and insert -- given --, therefor.

Signed and Sealed this
First Day of September, 2015

Michelle K. Lee
*Director of the United States Patent and Trademark Office*